United States Patent
Chen

(10) Patent No.: US 11,928,436 B2
(45) Date of Patent: Mar. 12, 2024

(54) SYSTEMS AND METHODS FOR PROVIDING A VISUALIZATION TOOL FOR ANALYZING UNSTRUCTURED COMMENTS

(71) Applicant: TYNTRE, LLC, Irvine, CA (US)

(72) Inventor: Thomas Chen, Irvine, CA (US)

(73) Assignee: TYNTRE, LLC, Irvine, CA (US)

( * ) Notice: Subject to any disclaimer, the term of this patent is extended or adjusted under 35 U.S.C. 154(b) by 0 days.

(21) Appl. No.: 18/057,625

(22) Filed: Nov. 21, 2022

(65) Prior Publication Data

US 2024/0028833 A1 Jan. 25, 2024

Related U.S. Application Data

(63) Continuation of application No. 17/871,244, filed on Jul. 22, 2022, now Pat. No. 11,507,754.

(51) Int. Cl.
*G06F 17/00* (2019.01)
*G06F 16/35* (2019.01)
*G06F 40/30* (2020.01)

(52) U.S. Cl.
CPC ............ *G06F 40/30* (2020.01); *G06F 16/358* (2019.01)

(58) Field of Classification Search
None
See application file for complete search history.

(56) References Cited

U.S. PATENT DOCUMENTS

| | | | | |
|---|---|---|---|---|
| 10,861,439 | B2* | 12/2020 | Doyle | G06F 16/35 |
| 11,507,754 | B1* | 11/2022 | Chen | G06F 16/358 |
| 2016/0055427 | A1* | 2/2016 | Adjaoute | G06N 20/00 |
| | | | | 706/12 |
| 2020/0125639 | A1* | 4/2020 | Doyle | G06F 40/30 |
| 2020/0125928 | A1* | 4/2020 | Doyle | G06V 30/19147 |
| 2021/0182709 | A1 | 6/2021 | Manchanda et al. | |
| 2022/0067077 | A1 | 3/2022 | Tupakula et al. | |
| 2022/0207229 | A1* | 6/2022 | Perkins | G06F 40/30 |

* cited by examiner

*Primary Examiner* — Satwant K Singh
(74) *Attorney, Agent, or Firm* — Haynes and Boone, LLP

(57) ABSTRACT

Methods and systems are presented for analyzing feedback data associated with a content and generating an interactive graphical representation of the feedback data. Upon receiving a request from a user, a feedback analysis system may access feedback data associated with a content from a content hosting server. The feedback data may include comments submitted by viewers of the content. The feedback analysis system may analyze the comments and generate an interactive graphical representation of the feedback data. The interactive graphical representation may include icons that represents keywords that are relevant to the comments and sentiments of the viewers derived based on the comments. Upon receiving a selection of an icon, the feedback analysis system may present a comment that corresponds to the keyword and/or sentiment represented by the icon.

20 Claims, 7 Drawing Sheets

SYSTEMS AND METHODS FOR PROVIDING A VISUALIZATION TOOL FOR ANALYZING UNSTRUCTURED COMMENTS

CROSS REFERENCE TO RELATED APPLICATION

The present invention is a Continuation of U.S. patent application Ser. No. 17/871,244, filed Jul. 22, 2022, which is incorporated herein by reference in their entirety.

TECHNICAL FIELD

The present specification generally relates to text processing and analysis, and more specifically, to analyzing informal texts made in association with posted content according to various embodiments of the disclosure.

BACKGROUND

With the prevalence of online content sharing platforms, users have been able to seamlessly publicize or otherwise share user-generated content on the Internet and/or other media. The online content sharing platforms provide the back-end technologies and computer data storage that enables the users to post user-generated content to the platforms such that the user-generated content can be accessed by other users on the Internet. The user-generated content may include text (e.g., an article, a blog, etc.) and/or multi-media content (e.g., images, a video, etc.). When the user-generated content includes video content, an online content sharing platform may enable streaming of the content in real-time, such that other users may view the content as the content is being generated.

In order to facilitate engagement with the content and/or the content creator, many online content sharing platforms also enable viewers to provide feedback to the content. A common mechanism for enabling viewers to provide feedback is a "like" button and/or a "dislike" button. The "like" and "dislike" button mechanism enables the viewers to provide feedback very quickly, and allows an easy tally of positive and negative reactions to the content for the content creator. However, feedback that is received via the "like" and "dislike" button mechanism is limited to a single dimension. The "like" and "dislike" button mechanism also prevents the viewers from providing more elaborate opinions (e.g., including both positive and negative aspects in an opinion, etc.).

Some online content sharing platforms provide a comment mechanism that enables viewers to provide text-based comments in association with a content. The comment mechanism provides a text input box on a user interface (e.g., on the same user interface that presents the content, etc.), and viewers may insert free-form texts as comments via the comment mechanism for the content. Since the viewers can provide free-form texts as feedback to the content, the feedback can be multi-dimensional (or in an unlimited number of dimensions). One drawback of the comment mechanism is that because the feedback can include free-form texts (also referred to as "unstructured texts"), it is challenging (and time consuming) to review and/or understand the feedback in a cumulative manner. The problem is exacerbated when the volume of the comments is large (e.g., when the content generator and/or the content itself is popular, etc.). Thus, there is a need for developing a tool that automatically parses and analyzes feedback, and provides a meaningful summarization of the feedback to users.

Figure 1:
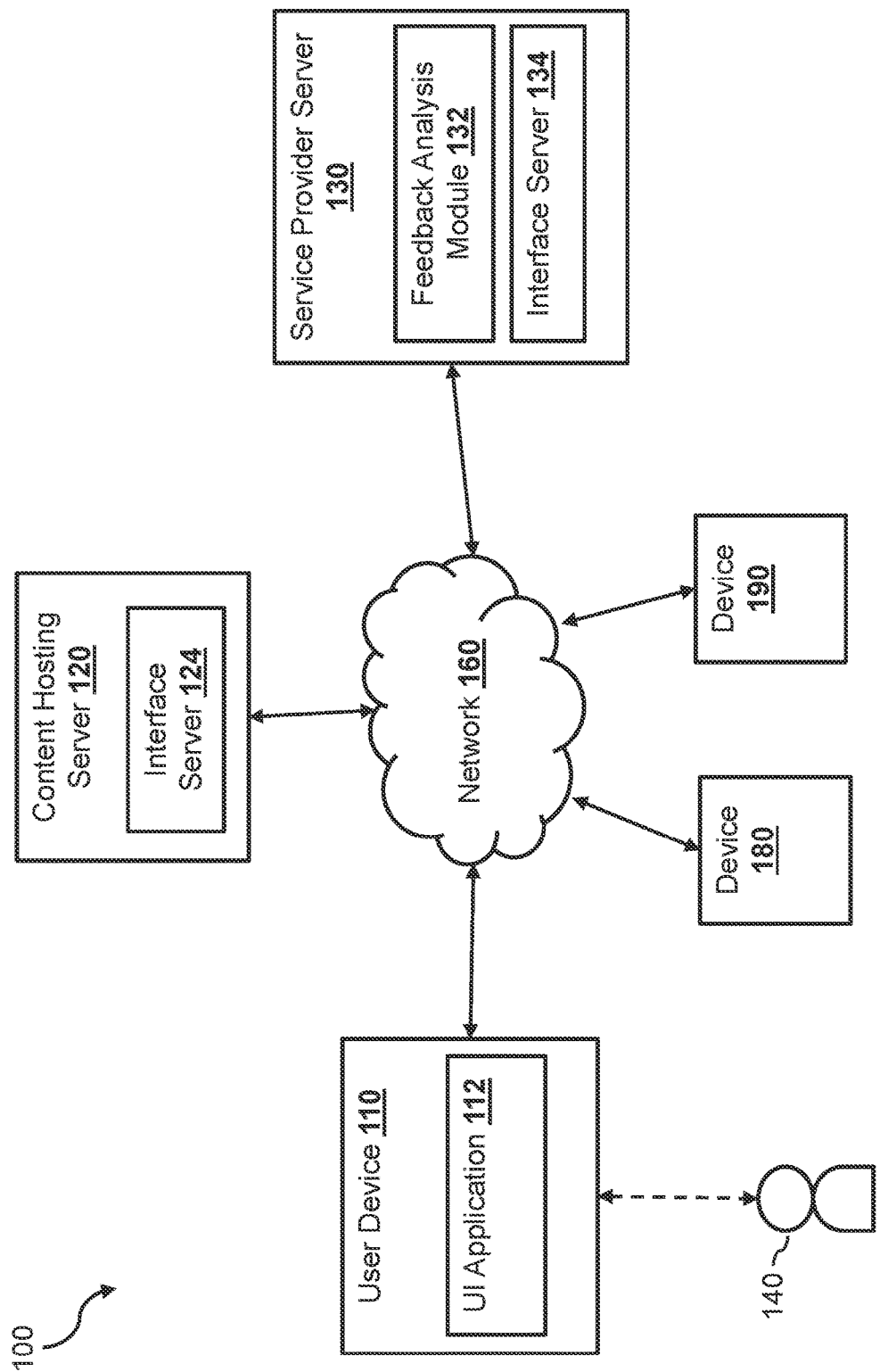
FIG. 1 is a block diagram illustrating an electronic communication system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for parsing and analyzing unstructured texts, and providing an interactive graphical representation that represents the unstructured texts in a summarized format. As discussed herein, content generators who share contents with others over a medium (e.g., the Internet, radio broadcast, television broadcast, broadcasted within a virtual reality environment such as a metaverse, etc.) often desire to interact with viewers of their content. One way to engage with the viewers is to enable the viewers to provide feedback in association with a content. For example, an online content sharing platform may provide, on a user interface (e.g., the user interface that presents the content or another user interface, etc.), one or more feedback mechanisms that enable the viewers to provide feedback to the content. The feedback mechanisms may include a "like" and/or "dislike" selector mechanism, a free-form text input mechanism, and others.

While the "like" and/or "dislike" selector mechanism is simple to use and easy for the content generator to understand quickly, it is limited to a single dimension and does not allow for more elaborate or meaningful feedback for the content. The comment mechanism solves this problem by enabling viewers to provide free-form texts (also referred to as "unstructured texts") as feedback to the content. However, while the feedback provided via the comment mechanism can be multi-dimensional, it is challenging for the content generator to understand and analyze the feedback.

Consider an example of a fitness trainer who frequently shares fitness content (e.g., fitness videos) on an online content sharing platform. As a popular fitness trainer, her content may be viewed by millions of viewers. The amount of feedback for each content provided by the trainer may include as high as hundreds or thousands of comments. The fitness trainer may wish to understand the preferences of her audience (e.g., what her audience likes or dislikes, what type of exercises do they prefer, what type of exercises do they find challenging, etc.), such that the fitness trainer can generate content in the future that better caters to the interests and preferences of her audience. However, manually reading through the hundreds or thousands of comments may take too much time and effort, which takes away the time for her to generate new content.

Consider another example of a speaker giving a speech in a live environment. The speech may include different topics, and may be conducted in a fluid manner, where the speaker may determine to spend more time on one topic over another topic while the speech is being given. While a feedback mechanism may be used to provide immediate, real-time feedback to the speaker, it is a challenge for the speaker to understand the feedback in real-time while giving the speech, especially when numerous new comments are continuously being added as the speech is being given.

As such, according to various embodiments of the disclosure, a system (also referred to as a "feedback analysis system") may automatically parse and analyze unstructured texts (e.g., the feedback in the form of free-form text inputs), and provide an interactive graphical representation of the unstructured texts. When content (e.g., text content, audio content, video content, etc.) is presented via a media (e.g., over the Internet via an online content sharing platform, over a radio broadcast, over a television broadcast, broadcasted within a virtual reality environment, etc.), an online platform may provide an interface that enables viewers of the content to provide feedback to the content. Via the interface, viewers may provide various feedback to the content, such as a binary indication (e.g., a "like" or "dislike" indication), free-form texts, and/or other inputs.

The system may detect the feedback to the content uploaded to the online platform, and may obtain the feedback from a server associated with the online platform. In some embodiments, when the feedback includes unstructured texts, the system may perform a series of natural language processing to the unstructured texts to derive meanings to the comments. For example, using one or more machine learning-based natural language processing (NLP) models (e.g., the Bidirectional Encoder Representation from Transformers (BERT) model, spaCy, etc.) and other text analysis tools (e.g., term frequency-inverse document frequency (TF-IDF), etc.), the system may analyze each comment based on the words in the comment (e.g., frequencies of the words in the comment, the positions of the words in the comments, relationships of each word with other surrounding words in the comments, etc.).

The system may then derive different information about the comments based on the analysis. In some embodiments, the system may derive information on a global level and a local level. On a global level, the system may derive information that applies to the entire collection of comments in association with a content. For example, the system may determine, based on a frequency analysis (e.g., using the TD-IDF analysis), that certain keywords are more relevant to the overall feedback associated with the content than other words. Those keywords may appear more frequently than other words in the feedback, and may be unique to the content (e.g., the keywords do not appear as frequently in other documents or other types of comments, etc.).

In some embodiments, the system may cluster the words in the comments into different clusters, based on the relatedness of different words (e.g., how close are the words appear with each other in the comments). The system may identify one or more clusters having a density (e.g., an amount of connections, an amount of words, etc.) above a pre-determined threshold. The system may then designate at least some of the words within the identified clusters as keywords (or popular topics) associated with the content.

On a local level, the system may derive various information associated with individual comments. For example, the system may derive a sentiment from each comment. A sentiment is an attitude or a judgment toward an object. As such, the sentiment that the system derived from a comment may indicate an attitude or a judgment that a viewer (e.g., the viewer who provides the comment) has toward the content. In some embodiments, since a viewer may provide multiple comments for the same content on the online platform, the system may combine the comments that are associated with the same viewer, and analyze the comments collectively to derive the sentiment, such that the derived sentiment represents the overall attitude or judgment of the single viewer toward the content. In some embodiments, the sentiment can be binary in nature (e.g., positive or negative, etc.). In some embodiments, however, the sentiment can be a value on a spectrum (e.g., a value within a range, such as 0-100, where 0 indicates most negative and 100 indicates most positive).

In some embodiments, the derived sentiments can be multi-faceted. For example, the system may derive a sentiment toward the subject matter that is being presented in the content and another sentiment toward the presentation of the subject matter in the content. In some embodiments, the system may also associate specific sentiments toward different portions of the content, such as different segments of the content.

After deriving the information associated with the feedback, the system may generate and present, on a user interface of a device, an interactive graphical representation of the feedback. In some embodiments, the interactive graphical representation represents a summary of the feedback. Thus, instead of reading and parsing through thousands, or hundreds of thousands, of comments, a user may gain an accurate understanding of the feedback (and also the content) by merely viewing and interacting with the interactive graphical representation generated by the system (instead of manually reading through the comments themselves).

In some embodiments, the interactive graphical representation may include a cluster of icons, where the centroid of the cluster represents a corresponding content associated with the feedback. The icons surrounding the centroid (and linked to the centroid in some embodiments) may represent different information derived from the feedback by the system. For example, the icons surrounding the centroid may represent sentiments of the viewers, where each icon may represent a sentiment associated with a distinct viewer. Each of the icon may be selectable. When an icon representing a particular sentiment of a viewer is selected, the system may present, on the user interface, the one or more comments posted by the viewer, from which the sentiment was derived.

In some embodiments, the icons surrounding the centroid may represent the keywords extracted from the feedback using the techniques described herein. For example, each icon surrounding the centroid may represent a distinct keyword extracted from the feedback. In some embodiments, the system may generate the cluster such that each of the icons may have one or more attributes (e.g., a size, a color, a distance from the centroid, etc.) that represent different characteristics of the keyword. For example, each icon may have a first attribute (e.g., a size attribute, a distance attribute, etc.) that represents a relatedness of the corresponding keyword to the overall feedback and/or the content. An icon having a larger size (or closer to the centroid) may indicate that the corresponding keyword has a higher relatedness (or correlation) to the feedback and/or the content, whereas an icon having a smaller size (or farther away from the centroid) may indicate that the corresponding keyword has a lower relatedness (or correlation) to the feedback and/or the content.

Each icon may also have a second attribute (e.g., a color attribute) that represents the sentiment of the comments that include the corresponding keyword. For example, a particular sentiment (e.g., a positive sentiment) may be represented by a first color and the opposite sentiment (e.g., a negative sentiment) may be represented by a second color. Based on the overall sentiment associated with the comments that include the corresponding keyword, a particular color (or a combination of colors) may be associated with the icon. In some embodiments, the icon may be divided into two portions, where one portion is associated with the first color and the other portion is associated with the second color. When the overall sentiment is neutral (e.g., when half of the comments that include the corresponding keyword is positive and the other half of the comments that include the keyword is negative), the portions are of equal size. However, when more comments that include the keyword is positive (or negative), the portion that represents the positive sentiment (or the negative sentiment) may be larger. In some embodiments, the system may mix the two colors according to a ratio that represents the overall sentiment (e.g., the ratio between the number of comments that have positive sentiment and the number of comments that have negative sentiment, etc.). The system may then present the icon in the mixed color.

In some embodiments, the icons that represent the keywords are also selectable. For example, upon receiving a selection of an icon in the interactive graphical representation, the system may present comments that include the corresponding keywords, and the sentiment analysis of the individual comments on the user interface.

As such, by viewing and interacting with the graphical representation, a user can quickly understand the feedback and/or the content. In the instances where the content generator provides the content in real-time, by viewing and interacting with the graphical representation while presenting the content, the content generator can quickly digest the feedback and react to the feedback (e.g., determine what subject matter to be included in the content, modify the content, etc.).

In some embodiments, the system may also analyze feedback associated with multiple contents. It is common that a content generator may generate and share multiple contents (e.g., a series of related content, etc.) over a period of time. For example, a fitness trainer may generate and share a series of fitness training videos over a period of time. In another example, a fashion designer may generate and present a series of different designs over a period of time. The system may analyze the feedback associated with the series of content that were generated and shared over the period of time, and derive information for the series of content.

In some embodiments, the system may derive trend information based on analyzing the feedback data associated with the multiple content. For example, the system may determine changes in the ratio between positive and negative feedback (e.g., comments associated with the positive sentiment and comments associated with the negative sentiment) across the different content, and present the changes as a trend on the user interface.

In some embodiments, the system may identify certain keywords that are associated with a first content having more positive feedback and that do not appear (or appear less frequently) in a second content having less positive feedback. The system may also identify certain keywords that are associated with a third content having more negative feedback and that do not appear (or appear less frequently) in a fourth content having less negative feedback. Those keywords may indicate the reasons (or indicators) why some contents have more positive (or negative) comments than others. As such, the system may present those keywords on the user interface to the user as signals to positive and negative feedback.

In some embodiments, when feedback associated with multiple contents is being analyzed together, the system may generate two clusters of icons on the user interface, where each cluster of icons represent words included in the feedback associated with a distinct content. In some embodiments, when a word is included in comments that associated with the two different contents, the icon that represents the word is linked to both centroids, representing the two contents. As such, when the two clusters are presented on the user interface side by side, a user can easily tell the common words used in the comments associated with the two contents.

In some embodiments, the icon that represents a word shared by the comments of the two contents may show attributes that represent the sentiments from the comments of the two contents. In some embodiments, the system may divide the icon into two portions representing respective sentiments of feedback associated with the two contents. For example, the system may determine a first sentiment associated with feedback that includes the keyword and associated with a first content, and may fill a first portion of the icon with a first color representing the first sentiment. The system may also determine a second sentiment associated with feedback that includes the keyword and associated with a second content, and may fill a second portion of the icon with a second color representing the second sentiment. Thus, with a glance of the icon, a user can determine a shift of sentiment between the two contents in association with a particular keyword quickly.

In some embodiments, based on analyzing historic feedback related to various contents, such as by training a machine learning model using historic feedback data, the system may (e.g., using the trained machine learning model), predict sentiments of future feedback associated with a content based on an initial set of feedback. For example, when a content is initially published (or shared) for a first period of time (e.g., an hour, a day, a week, after the content is shared, etc.), the system may analyze the feedback posted during the first period of time, and provide the analytical data to the machine learning model. The analytical data may include a timing of the feedback, the words included in the feedback, and the sentiment derived from the feedback, etc. Based on the analytical data, the machine learning model may be configured and trained to predict a sentiment of other viewers who have yet to provide feedback associated with the content (or who have yet to even view the content). Those viewers may view the content and provide feedback during a second period of time after the first period of time. As such, the system may provide information about a predicted sentiment of viewers even before the feedback of the viewers is posted. Consider a speaker providing a speech during a live event. A server may be receiving up-to-date feedback from viewers. Since the event is a live event, the initial amount of feedback may be limited while the speech is being given. However, using the machine learning model, the system may predict additional feedback (e.g., sentiments of the additional feedback) that may be received in the future, and provide the prediction to the speaker. The predicted sentiment may allow the speaker to modify the speech on the fly (e.g., in order to improve the sentiment of the viewers).

FIG. 1 illustrates an electronic communication system 100 within which the system (e.g., the feedback analysis system) may be implemented according to one embodiment of the disclosure. The electronic communication system 100 includes a service provider server 130 associated with a service provider, a content hosting server 120 associated with a content hosting entity, and user devices 110, 180, and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the content hosting server 120, the service provider server 130, and/or other user devices similar to the user device 110 over the network 160. For example, the user 140 may use the user device 110 to post one or more contents on the content hosting server 120 via an interface generated by the interface server 124, may view contents posted by other users on the interface, and may submit a request to the service provider server 130 for analyzing feedback associated with content posted by the user 140 on the content hosting server 120.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc. The user device 110, in one embodiment, includes a user interface (UI) application 112 (e.g., a web browser), which may be utilized by the user 140 to interact with the content hosting server 120 and/or the service provider server 130 over the network 160.

In various implementations, the user 140 is able to input data and information into an input component (e.g., a keyboard) of the user device 110 to generate content, to post content on the content hosting server 120, and transmit various instructions to the content hosting server 120 and/or the service provider server 130.

Each of the devices 180 and 190 may be similar to the user device 110. Specifically, the users of the devices 180 and 190 may use the respective device to post contents on the content hosting server 120, view contents that are posted on the content hosting server 120, submit feedback to content that is hosted by the content hosting server, and/or transmit a request for analyzing feedback data to the service provider server 130.

The service provider server 130, in one embodiment, may be maintained by an online service provider, which may provide services (e.g., data analytics services, etc.) for users. The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a feedback analysis request page and is configured to receive user requests for analyzing feedback from users. The interface server 134 may also include other electronic pages associated with the different services (e.g., a user interface for presenting feedback analysis data, etc.) offered by the service provider server 130. As a result, a user (e.g., the user 140 or other users of devices 180 and 190, etc.) may transmit requests and view/interact with feedback analysis data via one or more user interfaces provided by the interface server 134. For example, the interface server 134 may present a user interface that enables a user (e.g., the user 140, the users of the devices 180 and 190) to submit a request for analyzing feedback data. Via the interface provided by the interface server 134, the user (e.g., the user 140) may provide a network address associated with a content hosting server (e.g., the content hosting server 120) that stores the feedback data. In some embodiments, the user may provide a network address (e.g., a Uniform Resource Locator (URL), etc.) associated with the content hosting server 120 or the specific webpage that presents the feedback data in the request.

In a particular example, the user 140 may have generated or otherwise obtain content (e.g., a speech, a video, a blog, etc.), and may have uploaded the content to the content hosting server 120 via an interface provided by the interface server 124 for sharing. The interface may include one or more mechanisms, as described herein, that enables users to provide feedback to the content. For example, the interface may include a "like" and "dislike" selector mechanism that enables users to select a binary option (e.g., like or dislike) for the content. The interface may also include a comment mechanism that enables users to provide unstructured texts (e.g., free-form texts) as feedback to the content. The user 140 may desire to understand the sentiments and opinions of her viewers. For example, the user 140 may determine how to generate the next content based on the sentiments and opinions of viewers toward the content that has been shared via the content hosting server 120. The user 140 may continue to generate similar content (having similar topics or subject matters) when the sentiments and opinions are positive and may determine to generate content of different topics or different subject matters when the sentiments and opinions are not positive. Thus, the user may transmit a request to the service provider server 130, via an interface generated by the interface server 134, for analyzing the feedback data associated with the content shared via the content hosting server 120. The user may provide the network address of the interface that presents the feedback data to the service provider server 130.

The service provider server 130 may include a feedback analysis module 132 for accessing and analyzing feedback data based on a request from a user (e.g., the user 140). In some embodiments, the feedback analysis system may implement the functionality of the system (the feedback analysis system) as disclosed herein. In some embodiments, the feedback analysis module 132 may access feedback data stored on the content hosting server 120. For example, through one or more application programming interface (API) calls, the feedback analysis module 132 may transmit a request to the content hosting server 120 to obtain data presented on an interface generated by the interface server 124. In another example, the feedback analysis module 132 may access the interface generated by the interface server 124 using a user interface application (e.g., a web browser), and may scrap data from the interface. The interface may be used by the content hosting server 120 to present a user-generated content (e.g., a content generated by the user 140 or other users) and/or feedback related to the user-generated content. In some embodiments, based on a request and a network address from a user (e.g., the user 140) received via the interface provided by the interface server 134, the feedback analysis module 132 may access the feedback data based on the network address.

Figure 2:
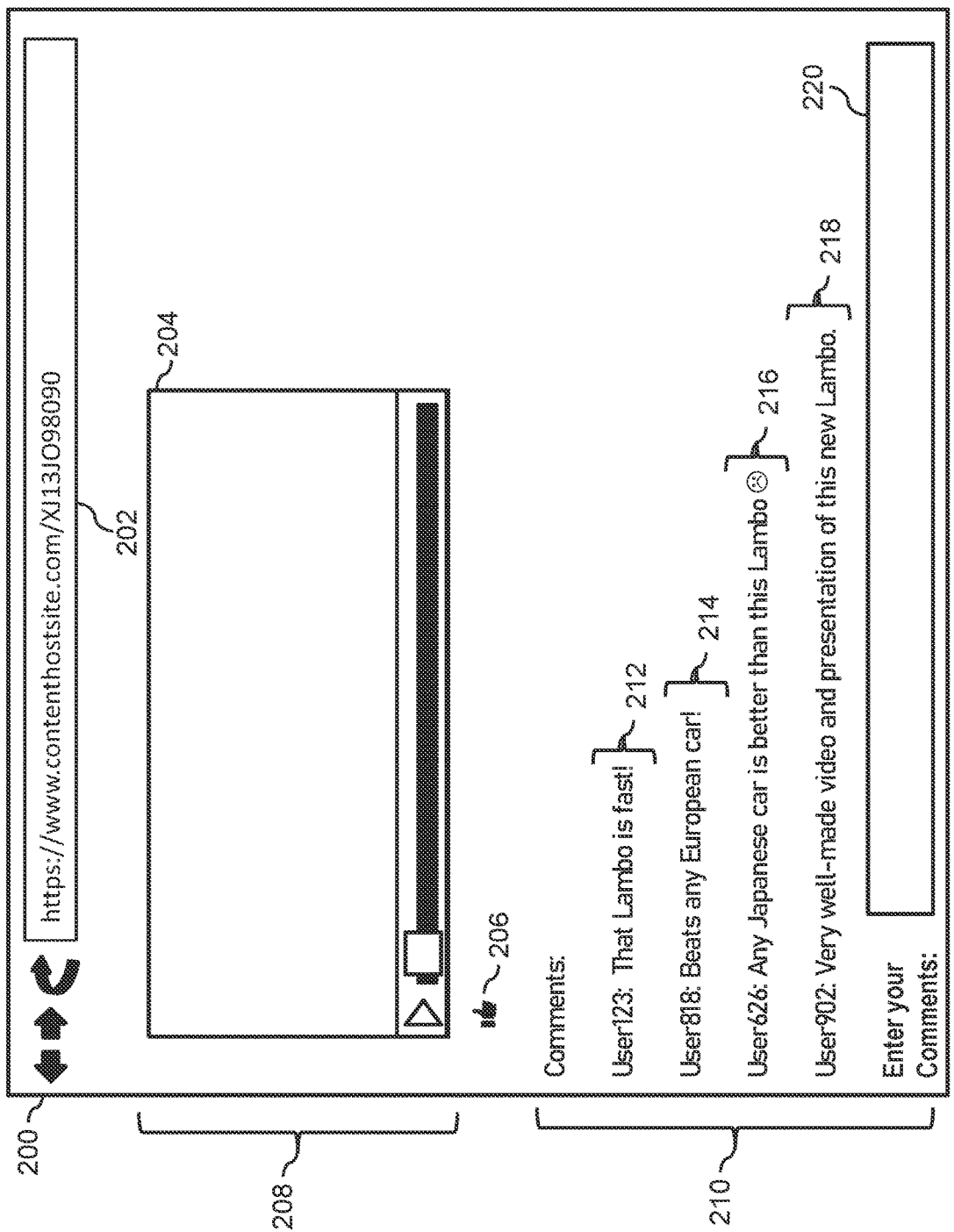
FIG. 2 illustrates an example interface for receiving feedback to a content according to an embodiment of the present disclosure.

FIG. 2 illustrates an example interface 200 provided by the interface server 124 of the content hosting server 120 according to various embodiments of the disclosure. In this example, the interface 200 is implemented as a webpage, which can be accessed by a web browser based on a URL (e.g., the URL 202). As shown, the interface 200 includes an area 208 for presenting a content 204. The content 204, in this example, includes a video, and may have been generated by the user 140 and uploaded to the content hosting server 120. After uploading the content 204, the content hosting server 120 may publish the content 204 on the interface 200, such that other users (e.g., users of the devices 180 and 190, etc.) may view the content 204 by accessing the URL 202.

The interface 200 may also include various feedback mechanisms that enable users to provide feedback to the content 204. In this example, the interface 200 includes a "like" selector (e.g., a "like" button) 206, where a user may select the "like" selector 206 if the user has a positive opinion about the content 204. In some embodiments, the content hosting platform 120 may tally the total number of users who have selected the "like" selector 206 for the content 204, and may publish the number of "likes" on the interface 200.

The interface 200 in this example also includes an area 210 that implements a comment mechanism configured to receive feedback in the form of unstructured texts from users. As shown, the area 210 presents existing comments 212, 214, 216, and 218 that have been submitted by various viewers of the content 204. The area 210 also includes a text input box 220 that enables a user accessing the interface 200 to provide a new comment as a feedback to the content 204. As discussed herein, the comment mechanism for obtaining feedback can be advantageous over the "like" and/or "dislike" selector mechanism as the comment mechanism allows viewers to provide feedback that can be more than a single dimension. Furthermore, through inputting free-form texts, viewers can describe and elaborate on their opinions in more details using different descriptive words.

Using the example illustrated above, the user 140, who has posted the content 204 to the content hosting server 120, may transmit a request to the service provider server 130 for analyzing feedback to the content 204. The request may include a network address (e.g., the URL 202). Based on the URL, the feedback analysis module 132 may access the data associated with the interface 200, which may include the content 204, the tally of "likes" via the "like" selector mechanism 206, and the comments 212, 214, 216, and 218 submitted by various viewers of the content 204.

In some embodiments, the feedback analysis module 132 may use one or more machine learning-based natural language processing (NLP) models (e.g., the Bidirectional Encoder Representation from Transformers (BERT) model, spaCy, etc.) and other text analysis tools (e.g., term frequency-inverse document frequency (TF-IDF), etc.) to analyze the comments 212, 214, 216, and 218. For example, based on analyzing the words and the relationship of each word in a comment with respect to other words in the comment (e.g., using a machine learning-based NLP model), the feedback analysis module 132 may derive a sentiment for the comment. Through training the NLP model, the NLP model may recognize certain words that are generally associated with a positive sentiment and words that are generally associated with a negative sentiment. The MLP model may also be trained (based on training data, such as historical comments that are labeled with sentiment labels, etc.) to analyze the words based on its position within the comment and surrounding words in either or both directions in the comment. By analyzing the words based on its position within the comment and surrounding words in either or both directions in the comment, a more accurate sentiment may be determined than simply analyzing the words themselves.

Using the models and tools described herein, the feedback analysis module 132 may derive different information about the comments (e.g., the comments 212, 214, 216, and 218) based on the analysis. In some embodiments, the feedback analysis module 132 may derive information on a global level and a local level. On a global level, the feedback analysis module 132 may derive information that applies to the entire collection of comments (e.g., the comments 212, 214, 216, and 218, collectively). For example, the feedback analysis module 132 may determine, based on a frequency analysis (e.g., using the TD-IDF analysis), that certain keywords that appear in the comments are more relevant to the overall feedback to the content 204 than other words. Those keywords may appear more frequently than other words in the feedback (e.g., in the comments 212, 214, 216, and 218), and may be unique to the content (e.g., the keywords do not appear as frequently in other documents or comments to other contents, etc.).

In some embodiments, the feedback analysis module 132 may cluster the words in the comments 212, 214, 216, and 218 into different clusters, based on the relatedness of different words (e.g., how close are the words appear with each other in the comments). The feedback analysis module 132 may identify one or more clusters having a density (e.g., an amount of connections, an amount of words, etc.) above a pre-determined threshold. The feedback analysis module 132 may then designate at least some of the words within the identified clusters as keywords (or popular topics) associated with the content. The feedback analysis module 132 may then present these keywords in an interactive manner to allows a quick understanding of the content 204 and/or the feedback to the content 204 without viewing the content 204 or reading through the feedback. The interactive presentations of feedback will be discussed in more detail below by reference to FIG. 3.

On a local level, the feedback analysis module 132 may derive various information associated with each individual comments. For example, the feedback analysis module 132 may derive a sentiment from each comment. The sentiment derived from a comment may indicate an attitude or a judgment that a viewer (e.g., the viewer who provides the comment) has toward the content (e.g., the content 204). In some embodiments, since a viewer may provide multiple comments for the same content, the feedback analysis module 132 may combine the comments that are associated with the same viewer, and analyze the comments collectively to derive the sentiment, such that the derived sentiment represents the overall attitude or judgment of the single viewer toward the content. In some embodiments, the sentiment can be binary in nature (e.g., positive or negative, etc.). In some embodiments, however, the sentiment can be a value on a spectrum (e.g., a value within a range, such as 0-100, where 0 indicates most negative and 100 indicates most positive). As such, based on training a machine learning-based NLP model, the trained NLP model may provide an output based on data associated with the words included in one or more comments. The output may be a value (e.g., a value within the predetermined range) that indicates a sentiment of the one or more comments.

In some embodiments, the derived sentiments can be multi-faceted. For example, the feedback analysis module 132 may derive a sentiment toward the subject matter that is being presented in the content and another sentiment toward the presentation of the subject matter in the content. In some embodiments, the feedback analysis module 132 may also associate specific sentiments toward different portions of the content, such as different segments of the content (e.g., different temporal range within an audio or a video, different paragraphs within an article, etc.).

After deriving the information associated with the feedback, the feedback analysis module 132 may generate and present, on a user interface (e.g., an interface generated by the interface server 134, such as a webpage), an interactive graphical representation of the feedback. In some embodiments, the interactive graphical representation represents a summary of the feedback. Thus, instead of reading and parsing through thousands, or hundreds of thousands, of comments, a user (e.g., the user 140) may gain an accurate understanding of the feedback (and also the content) by merely viewing and interacting with the interactive graphical representation.

Figure 3:
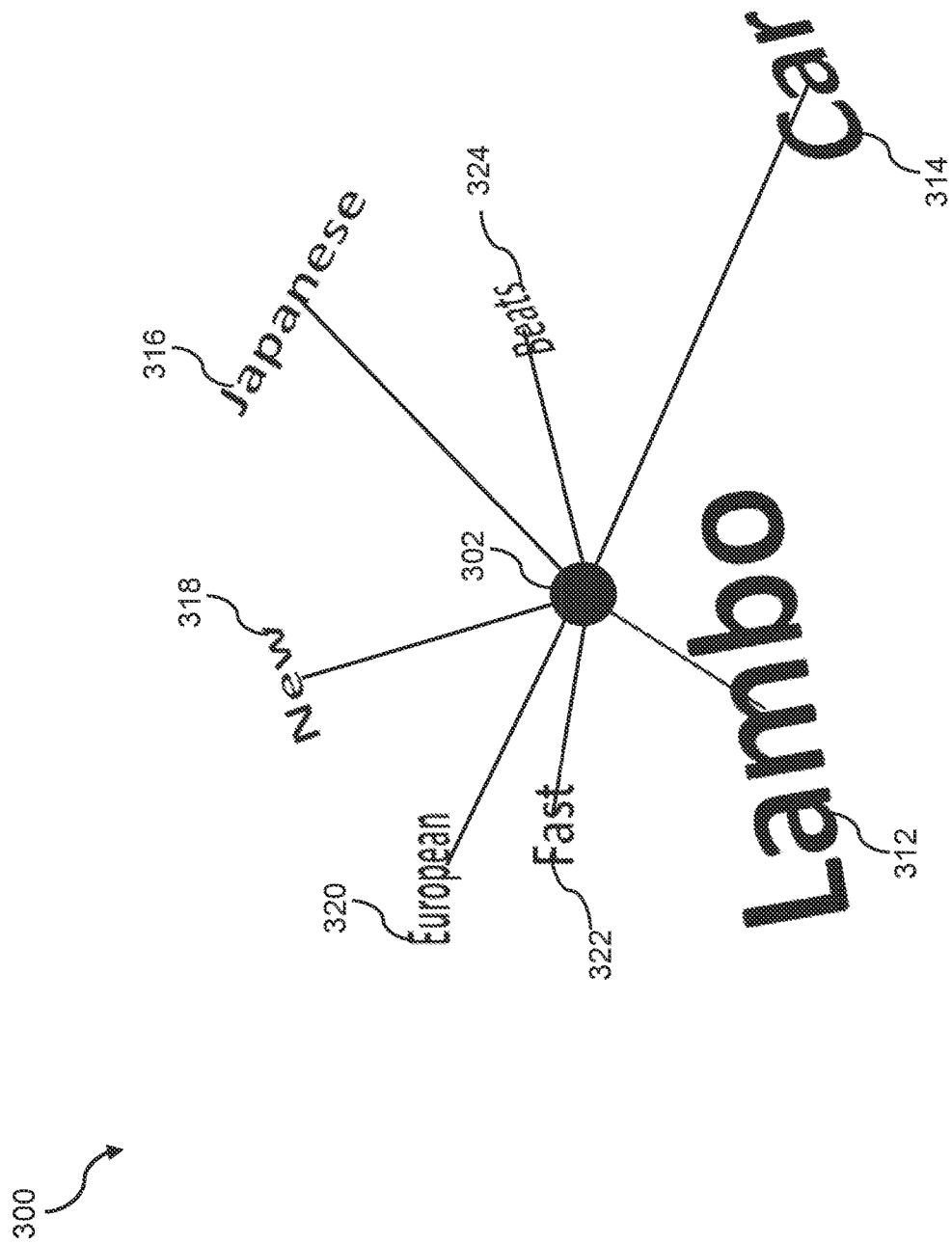
FIG. 3 illustrates an example interactive graphical representation of feedback data according to an embodiment of the present disclosure.

FIG. 3 illustrates an example interactive graphical representation 300 generated by the feedback analysis module 132 based on the comments 212, 214, 216, and 218 for the content 204 according to various embodiments of the disclosure. In this example, the interactive graphical representation 300 is implemented as a cluster having a centroid 302. The centroid 302 represents the content 204 for which the comments 212, 214, 216, and 218 were generated. The interactive graphical representation 300 also includes multiple icons 312, 314, 316, 318, 320, 322, and 324, representing different elements of the feedback. In this example, each of the icons 312, 314, 316, 318, 320, 322, and 324 represents a distinct keyword derived from the comments 212, 214, 216, and 218. As such, each of the icons 312, 314, 316, 318, 320, 322, and 324 represents a word that appears in at least one of the comments 212, 214, 216, and 218 and is determined to be relevant to the comments 212, 214, 216, and 218, and/or the content 204. In this example, the icon 312 represents the word "Lambo," the icon 314 represents the word "car," the icon 316 represents the word "Japanese," the icon 318 represents the word "new," the icon 320 represents the word "European," the icon 322 represents the word "fast," and the icon 324 represents the word "beats."

Each of the icons 312, 314, 316, 318, 320, 322, and 324 is connected (e.g., linked) to the centroid 302. In some embodiments, the feedback analysis module 132 may generate the interactive graphical representation 300 such that each of the icons 312, 314, 316, 318, 320, 322, and 324 may have one or more attributes (e.g., a size, a color, a distance from the centroid, etc.) that represent different characteristics of the corresponding keyword. In this example, each of the icons 312, 314, 316, 318, 320, 322, and 324 has a size attribute that represents a relatedness of the corresponding keyword to the overall feedback and/or the content 204. An icon having a larger size, in this example, may indicate that the corresponding keyword has a higher relatedness (or correlation) to the feedback and/or the content, whereas an icon having a smaller size (may indicate that the corresponding keyword has a lower relatedness (or correlation) to the feedback and/or the content. As such, based on viewing the interactive graphical representation 300, the user 140 (or any user viewing the interactive graphical representation 300) may immediately understand that the content 204 is about a new Lamborghini, and most viewers think the new car is fast and may beat other Japanese cars and/or European cars.

In some embodiments, each of the icons 312, 314, 316, 318, 320, 322, and 324 may also have a color attribute that represents the sentiments of the comments that include the corresponding keyword. For example, a particular sentiment (e.g., a positive sentiment) may be represented by a first color and the opposite sentiment (e.g., a negative sentiment) may be represented by a second color. Based on the overall sentiment associated with the comments that include the corresponding keyword, a particular color (or a combination of colors) may be associated with the icon. For example, the feedback analysis module 132 may fill the icon 312 representing the word "Lambo" with the first color when the comment(s) that include the word "Lambo" are positive, and may fill the icon 312 with the second color when the comment(s) that include the word "Lambo" are negative.

In some embodiments, the icon may be divided into two portions, where one portion is associated with the first color and the other portion is associated with the second color. When the overall sentiment is neutral (e.g., when half of the comments that include the corresponding keyword is positive and the other half of the comments that include the keyword is negative), the portions are of equal size. However, when more comments that include the keyword is positive (or negative), the portion that represents the positive sentiment (or the negative sentiment) may be larger. In some embodiments, the system may mix the two colors according to a ratio that represents the overall sentiment (e.g., the ratio between the number of comments that have positive sentiment and the number of comments that have negative sentiment, etc.). The system may then present the icon in the mixed color. Thus, without reading through the comments that include the keywords, one can easily tell how the keywords are associated with different sentiments by viewing the interactive graphical representation 300.

In some embodiments, each of the icons 312, 314, 316, 318, 320, 322, and 324 is also selectable. For example, upon receiving a selection of an icon in the interactive graphical representation, the feedback analysis module 132 may present comments (from the comments 212, 214, 216, and 218) that include the corresponding keywords, and the sentiment analysis of the individual comments on the user interface.

As such, by viewing and interacting with the interactive graphical representation 300, a user can quickly understand the feedback and/or the content 204. In the instances where the content is viewed in real-time (e.g., a live event, a live speech, etc.), by viewing and interacting with the interactive graphical representation 300 while presenting the content, the content generator can quickly digest the feedback and react to the feedback (e.g., determine what subject matter to be included in the content, modify the content, etc.).

In some embodiments, the feedback analysis module 132 may configure and train a machine learning model to predict sentiments of future comments (comments that have not yet been submitted) based on existing comments for a content. As such, the sentiment data (e.g., color attributes) of the icons may represent not only sentiments of existing comments, but also predicted sentiments of future comments.

In some embodiments, the feedback analysis module 132 may also analyze feedback associated with multiple contents. It is common that a content generator (e.g., the user 140) may generate and share multiple contents (e.g., a series of related content, etc.) over a period of time. For example, a fitness trainer may generate and share a series of fitness training videos over a period of time. In another example, a fashion designer may generate and present a series of different designs over a period of time. The feedback analysis module 132 may analyze the feedback associated with the series of content that were generated and shared over the period of time, and derive information for the series of content.

In some embodiments, the feedback analysis module 132 may derive trend information based on analyzing the feedback data associated with the multiple content. For example, the feedback analysis module 132 may determine changes in the ratio between positive and negative feedback (e.g., comments associated with the positive sentiment and comments associated with the negative sentiment) across the different content, and present the changes as a trend on the user interface.

Figure 4:
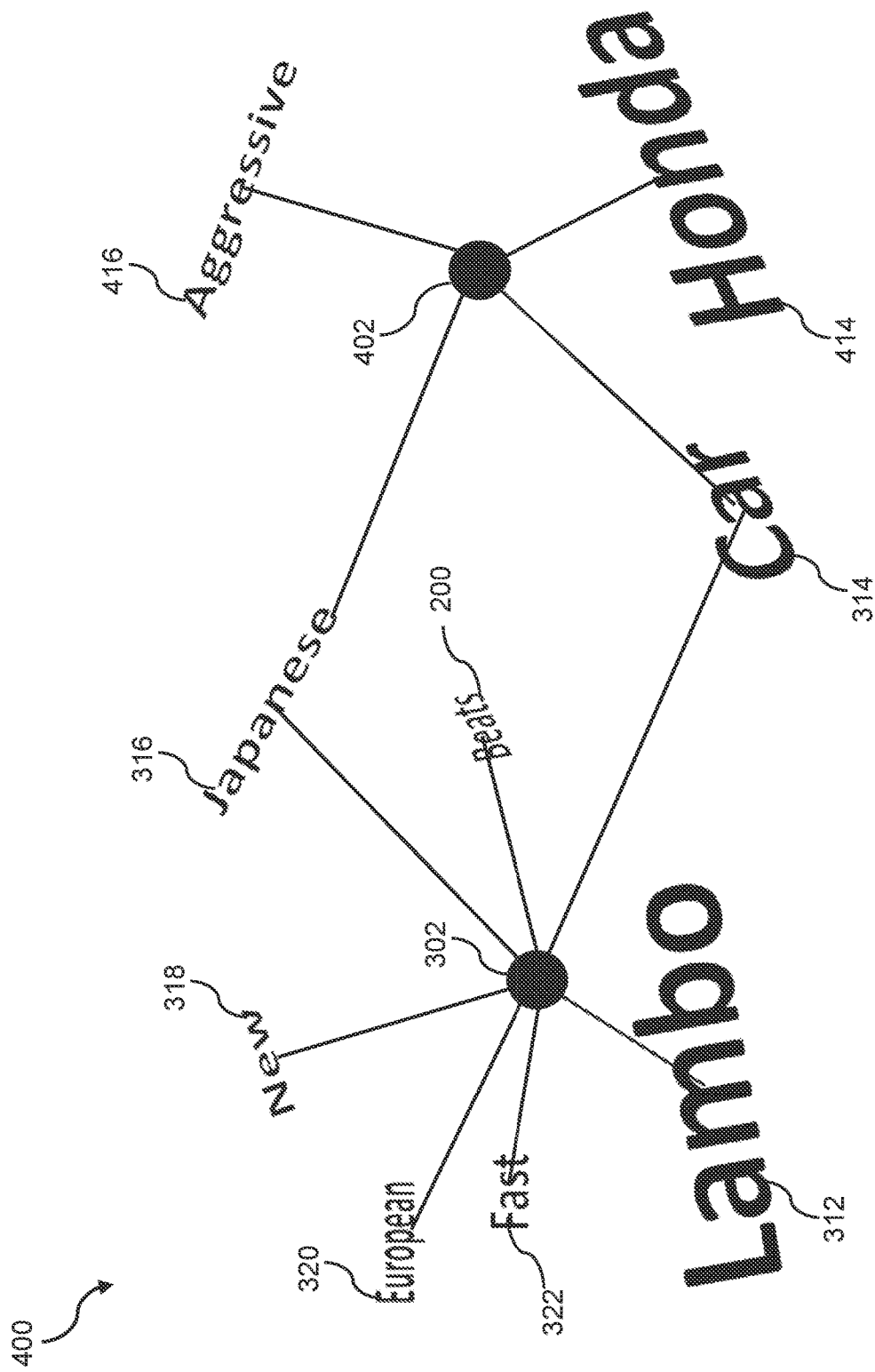
FIG. 4 illustrates another example interactive graphical representation of feedback data according to an embodiment of the present disclosure.

In some embodiments, the feedback analysis module 132 may present an integrated graphical representation to represent the feedback data associated with multiple contents. FIG. 4 illustrates an example integrated graphical representation 400 that presents feedback data associated with multiple contents (e.g., the content 204 and another content) according to various embodiments of the disclosure. In this example, while the content 204 is a video of a new Lamborghini model, the content represented by the centroid 402 may be a video of a new Honda model. As such, based on the similarities between the two contents (both are related to new car models), the feedback associated with the two contents may share one or more keywords. As shown in this example, the integrated graphical representation 400 includes two centroids 302 and 402. The centroid 302 represents the content 204 and the centroid 402 represents the new content. In some embodiments, the integrated graphical representation 400 includes the interactive graphical representation 300 that represents the feedback data associated with the content 204. The integrated graphical representation 400 may also include another interactive graphical representation that represents the feedback data associated with the new content, the interactive graphical representation may include the centroid 402 and the icons 414, 416, 314, and 316. As shown, since the feedback associated with the two contents share two common keywords: "car" and "Japanese," the icons 314 and 316 representing the two common keywords are linked to both the centroid 302 and the centroid 402.

In some embodiments, the icon that represents a word shared between the two contents (e.g., the icons 314 and 316) may show attributes that represent the sentiments from the comments of the two contents. In some embodiments, the feedback analysis module 132 may divide the icon into two portions representing respective sentiments of feedback associated with the two contents. For example, the feedback analysis module 132 may determine a first sentiment associated with feedback that includes the keyword and associated with a first content (e.g., the content 204), and may fill a first portion of the icon with a first color representing the first sentiment. The system may also determine a second sentiment associated with feedback that includes the keyword and associated with a second content (e.g., the new content), and may fill a second portion of the icon with a second color representing the second sentiment. Thus, with a glance of the icon, a user can determine a shift of sentiment between the two contents in association with a particular keyword quickly.

Figure 5:
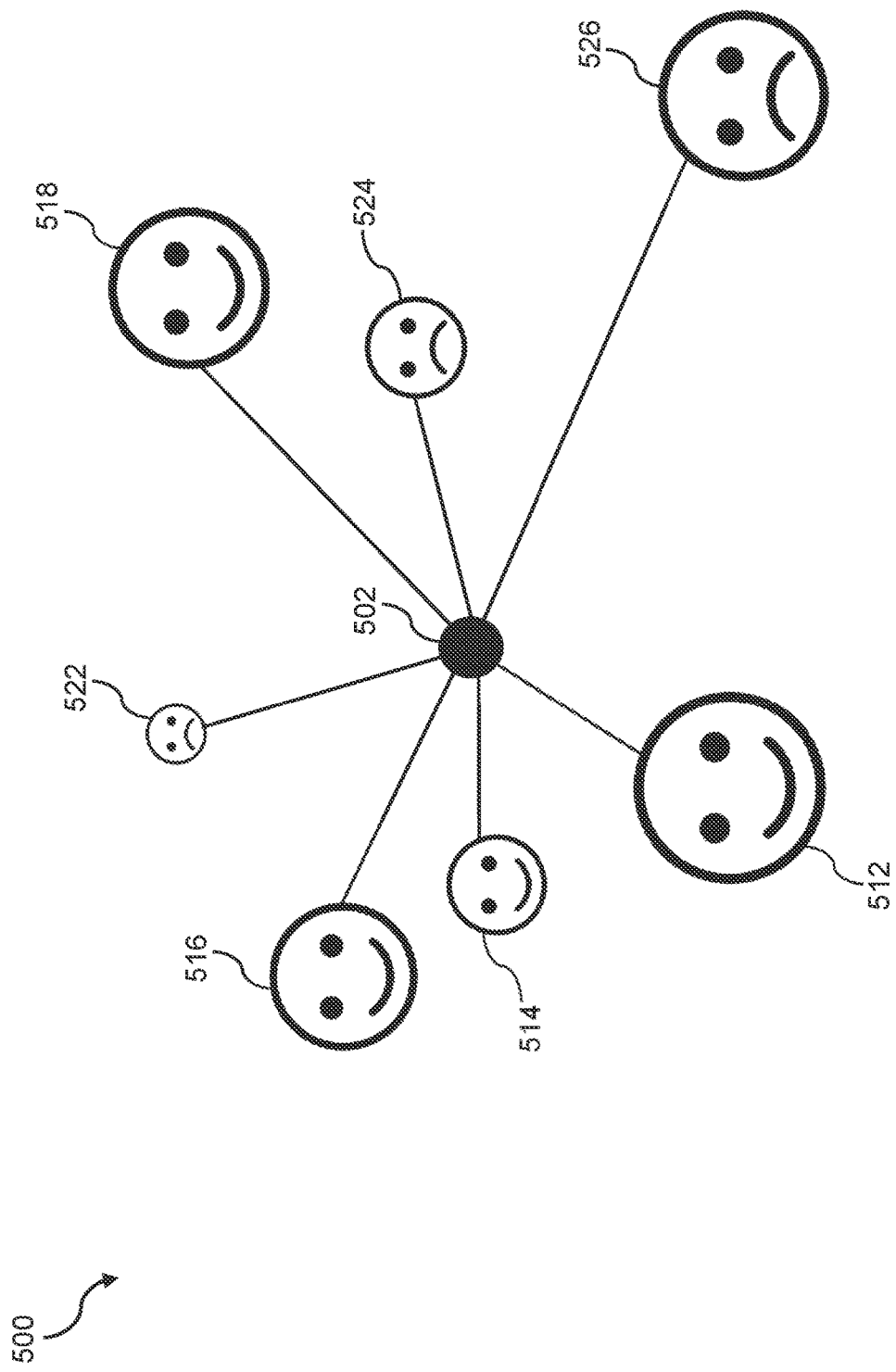
FIG. 5 illustrates another example interactive graphical representation of feedback data according to an embodiment of the present disclosure.

In some embodiments, instead of, or in addition to, representing keywords associated with the contents, the feedback analysis module 132 may include icons in an interactive graphical representation that represent sentiments of the viewers. For example, the interactive graphical representation may be generated such that each icon may represent a sentiment associated with a distinct viewer of the content. FIG. 5 illustrates an example interactive graphical representation 500 that presents sentiments of different viewers according to various embodiments of the disclosure. Similar to the interactive graphical representation 300 of FIG. 3, the interactive graphical representation 500 is implemented as a cluster having a centroid 502 representing a corresponding content (e.g., the content 204). The interactive graphical representation 500 also includes various icons, such as icons 512, 514, 516, 518, 522, 524, and 526, representing sentiments of different viewers of the content 204. In this example, the icons 512, 514, 516, 518, 522, 524, and 526 represent the sentiments of seven different viewers of the content 204, wherein the icons 512, 514, 516, and 518 represent a positive sentiment (as indicated by the happy face icon) and the icons 522, 524, and 526 represent a negative sentiment (as indicated by the sad face icon). In some embodiments, the feedback analysis module 132 may generate the icons 512, 514, 516, 518, 522, 524, and 526 with an attribute (e.g., a size attribute or other attributes) to represent an extent of the sentiment associated with the corresponding viewer. For example, an icon having a larger size may represent a larger extent of the sentiment where an icon having a smaller size may represent a smaller extent of the sentiment. Thus, the icon 512 may indicate that a viewer represented by the icon 512 has a more positive sentiment toward the content 204 than another viewer represented by the icon 514. Similarly, the icon 518 may indicate that a viewer represented by the icon 518 has a more negative sentiment toward the content 204 than another viewer represented by the icon 524.

In some embodiments, each of the icons 512, 514, 516, 518, 522, 524, and 526 is selectable. Upon receiving a selection of an icon, the feedback analysis module 132 may present, on the user interface, the comments submitted by the corresponding user.

Figure 6:
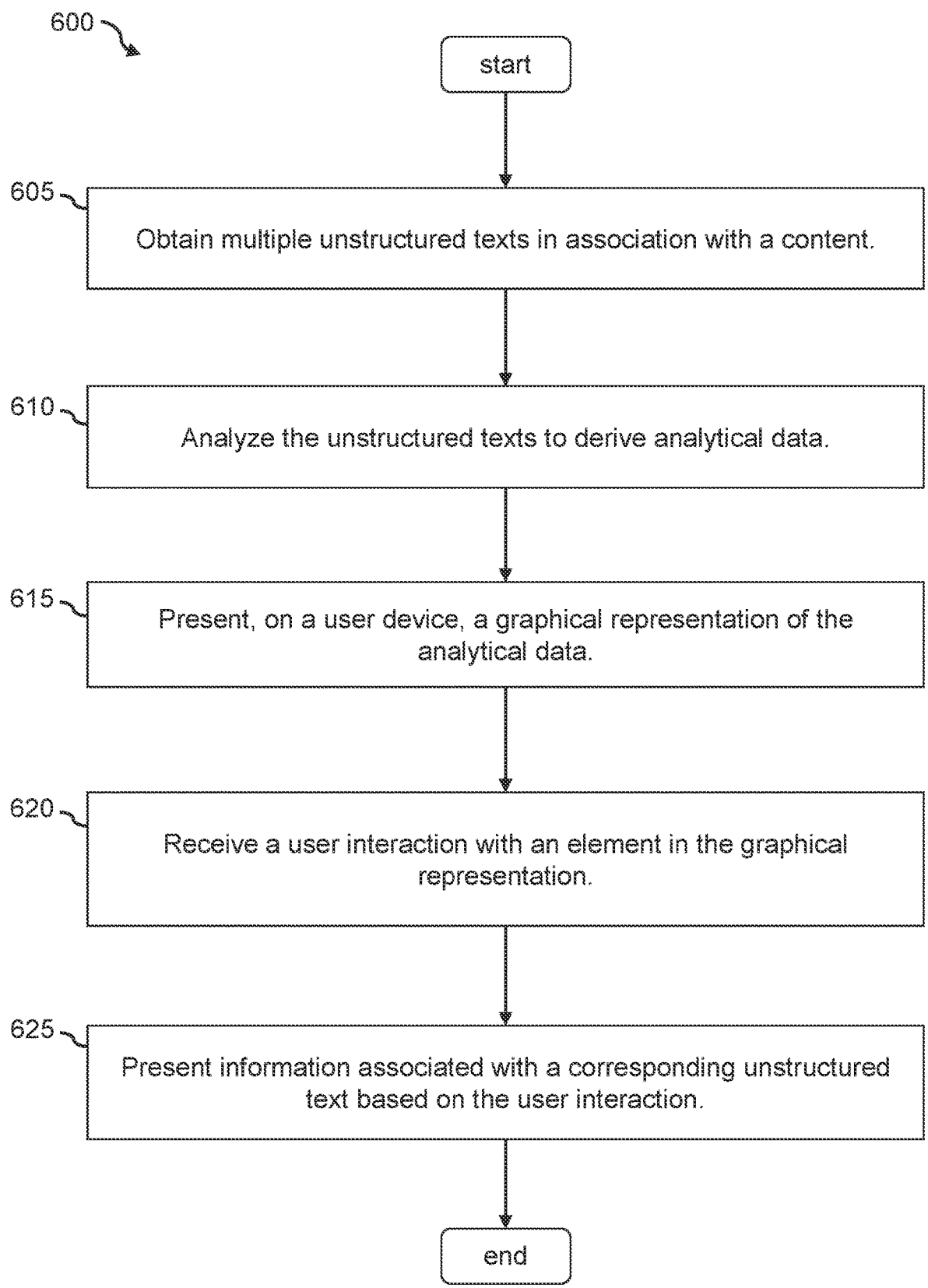
FIG. 6 is a flowchart showing a process of analyzing unstructured texts according to an embodiment of the present disclosure.

FIG. 6 illustrates a process 600 for presenting an interactive graphical representation of feedback data associated with a content according to various embodiments of the disclosure. In some embodiments, the process 600 may be performed, at least partially, by the feedback analysis module 132. The process 600 begins by obtaining (at step 605) multiple unstructured texts in association with a content. For example, the feedback analysis module 132 may access the content hosting server 120 and obtain feedback data that includes comments associated with a particular content (e.g., the content 204).

The process 600 then analyzes (at step 610) the unstructured texts to derive analytical data and presents (at step 615), on a user device, a graphical representation of the analytical data. For example, the feedback analysis module 132 may use one or more machine learning-based NLP models and/or word analysis tools to analyze the comments obtained from the content hosting server 120 in association with the content 204. In some embodiments, the feedback analysis module 132 may derive a sentiment for each of the comments. In some embodiments, the feedback analysis may derive keywords that are relevant to the comments collectively. The feedback analysis module 132 may then present an interactive graphical representation (e.g., the interactive graphical representations 300, 400, and/or 500) on a device (e.g., the user device 110).

The process 600 receives (at step 620) a user interaction with an element in the graphical representation and presents (at step 625) information associated with a corresponding unstructured text based on the user interaction. For example, each icon in the interactive graphical representations 300, 400, and/or 500 is selectable. When a selection of an icon is received, the feedback analysis module 132 may present a corresponding comment on the user interface.

Figure 7:
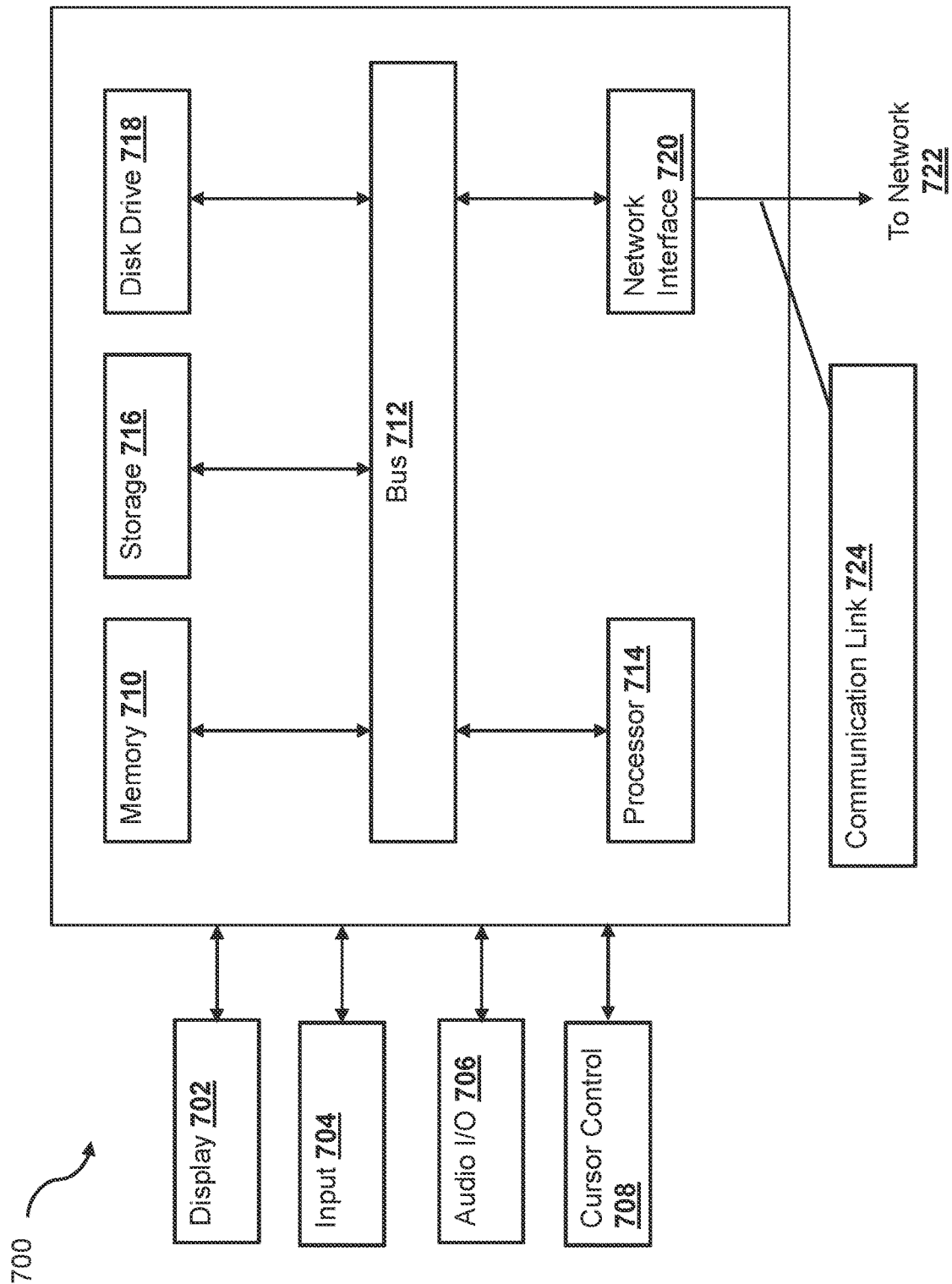
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the user device 110, and the device 180. In various implementations, the user device 110 and/or the device 180 may include a mobile cellular phone, personal computer (PC), laptop, wearable computing device, etc. adapted for wireless communication, and the service provider server 130 may include a network computing device, such as a server. Thus, it should be appreciated that the devices 110, 180, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account, a checkout page for purchasing an item from a merchant, or a chat interface for facilitating an online chat session. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the feedback analysis functionalities described herein according to the process 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
 a non-transitory memory; and
 one or more hardware processors coupled with the non-transitory memory and configured to read instructions from the non-transitory memory to cause the system to perform operations comprising:
  obtaining feedback data generated by a plurality of users in association with a set of content;
  performing a sentiment analysis on the feedback data;
  clustering the feedback data into a plurality of clusters based on the sentiment analysis on the feedback data, wherein each cluster in the plurality of clusters corresponds to a distinct sentiment toward a subject matter;
  receiving a first set of feedback associated with a particular content directed to the subject matter;
  predicting a sentiment from a group of users toward the particular content based on the first set of feedback and the plurality of clusters, wherein the group of users is different from the plurality of users; and
  modifying the particular content based on the predicted sentiment.

2. The system of claim 1, wherein the predicting the sentiment comprises:
 determining, from the plurality of clusters, a subset of clusters that corresponds to a subset of the feedback data generated by the group of users; and
 determining distinct sentiments corresponding to the subset of clusters toward the subject matter, wherein the sentiment is predicted further based on analyzing the distinct sentiments.

3. The system of claim 1, wherein the particular content comprises one of live content or streaming content.

4. The system of claim 1, wherein the particular content comprises pre-recorded content.

5. The system of claim 1, wherein the particular content comprises a video, and wherein the first set of feedback is received before the video ends.

6. The system of claim 1, wherein the feedback data comprises unstructured texts generated by the plurality of users.

7. The system of claim 1, wherein the modifying the particular content comprises at least one of removing a section from the particular content or changing a topic of the particular content.

8. The system of claim 2, wherein the operations further comprise:
 presenting the subset of clusters on a user interface; and
 receiving, via the user interface, an input from a content generator, wherein the particular content is modified further based on the input.

9. The system of claim 1, wherein the predicting the sentiment comprises using a machine learning model to predict the sentiment prior to the particular content being accessed by the group of users.

10. The system of claim 9, wherein the operations further comprise:
 subsequent to the predicting the sentiment, obtaining a second set of feedback generated by the group of users directed to the particular content; and
 training the machine learning model based on the second set of feedback.

11. A method comprising:
 obtaining feedback data generated by a first plurality of users in association with a set of content;
 performing, by a computer system, a sentiment analysis on the feedback data;
 clustering, by the computer system, the feedback data into a plurality of clusters based on the sentiment analysis on the feedback data, wherein each cluster in the plurality of clusters corresponds to a distinct sentiment toward a subject matter;
 receiving a first set of feedback associated with a particular content directed to the subject matter;
 predicting a sentiment from a second plurality of users toward the particular content based on the first set of feedback and the plurality of clusters; and
 modifying the particular content based on the predicted sentiment.

12. The method of claim 11, wherein the predicting the sentiment comprises:
 determining, from the plurality of clusters, a subset of clusters that corresponds to a subset of the feedback data generated by the second plurality of users; and
 determining distinct sentiments corresponding to the subset of clusters toward the subject matter, wherein the sentiment is predicted further based on analyzing the distinct sentiments.

13. The method of claim 11, wherein the particular content comprises one of live content or streaming content.

14. The method of claim 11, wherein the particular content comprises pre-recorded content.

15. The method of claim 11, wherein the particular content comprises a video, and wherein the first set of feedback is received before the video ends.

16. The method of claim 11, wherein the feedback data comprises unstructured texts generated by the first plurality of users.

17. The method of claim 11, wherein the modifying the particular content comprises at least one of removing a section from the particular content or changing a topic of the particular content.

18. The method of claim 12, further comprising:
 presenting the subset of clusters on a user interface; and
 receiving, via the user interface, an input from a content generator, wherein the particular content is modified further based on the input.

19. The method of claim 11, wherein the predicting the sentiment comprises using a machine learning model to predict the sentiment prior to providing the second plurality of users access to the particular content.

20. The method of claim 19, further comprising:
 subsequent to the predicting the sentiment, obtaining a second set of feedback generated by the second plurality of users directed to the particular content; and
 training the machine learning model based on the second set of feedback.

* * * * *